United States Patent
Gibbon (10) Patent No.: US 6,473,778 B1
(45) Date of Patent: Oct. 29, 2002

(54) GENERATING HYPERMEDIA DOCUMENTS FROM TRANSCRIPTIONS OF TELEVISION PROGRAMS USING PARALLEL TEXT ALIGNMENT

(75) Inventor: David Crawford Gibbon, Lincroft, NJ (US)

(73) Assignee: AT&T Corporation, New York, NY (US)

(*) Notice: Subject to any disclaimer, the term of this patent is extended or adjusted under 35 U.S.C. 154(b) by 0 days.

(21) Appl. No.: 09/240,601

(22) Filed: Feb. 1, 1999

Related U.S. Application Data (60) Provisional application No. 60/113,951, filed on Dec. 24, 1998.

(51) Int. Cl.⁷ .............................................. G06F 17/00
(52) U.S. Cl. ...................... 707/501.1; 348/468; 348/563
(58) Field of Search .......................... 707/501.1, 500.1; 725/137; 348/468, 563, 564

(56) References Cited

U.S. PATENT DOCUMENTS

| | | | | |
|---|---|---|---|---|
| 5,481,296 A | * | 1/1996 | Cragun et al. | 348/461 |
| 5,649,060 A | * | 7/1997 | Ellozy et al. | 369/25.01 |
| 5,664,227 A | * | 9/1997 | Mauldin et al. | 707/500.1 |
| 5,737,725 A | * | 4/1998 | Case | 704/260 |
| 6,025,837 A | * | 2/2000 | Matthews et al. | 345/721 |
| 6,076,059 A | * | 6/2000 | Glickman et al. | 704/252 |
| 6,098,082 A | | 8/2000 | Gibbon et al. | 707/501 |
| 6,243,676 B1 | * | 6/2001 | Witteman | 704/243 |
| 6,263,507 B1 | * | 7/2001 | Ahmad et al. | 709/217 |
| 6,271,892 B1 | * | 8/2001 | Gibbon et al. | 348/589 |
| 2001/0018693 A1 | * | 8/2001 | Jain et al. | 707/500 |

OTHER PUBLICATIONS

Lemay, Laura. Teach Yourself Web Publishing with HTML 4. Second Edition. 1997. Sam.net Publishing. pp. 731–732, 927–929.*

Intelligent Multimedia Information Retrieval, Chapter 11 *Informedia: News–on–Demand Multimedia Information Acquisition and Retrieval*, Alexander G. Hauptmann and Michael J. Witbrock (Mark T. Maybury ed., AAAI Press 1997).

Michael J. Witbrock and Alexander G. Hauptmann, *Improving Acoustic Models by Watching Television*, Carnegie Mellon University CMU–CS–98–110, 1998.

William A. Gale and Kenneth W. Church, *A Program for Aligning Sentences in Bilingual Corpora*, Computational Linguistics, 1993.

Church, K. *Char–align: A Program for Aligning Parallel Texts at the Character Level*, Association for Computational Linguistics, pp. 9–16, 1993.

(List continued on next page.)

Primary Examiner—Joseph H. Feild
(74) Attorney, Agent, or Firm—Morgan & Finnegan, LLP (57) ABSTRACT

An apparatus, method and computer program product for generating a hypermedia document from a transcript of a closed-captioned television program using parallel text alignment. The method includes the steps of receiving the closed-captioned text stream with its associated frame counts and the transcript, aligning the text of closed-captioned text stream and the transcript; transferring the frame counts from the closed-captioned text stream to the transcript; extracting video frames from the television program; and linking the frames to the frame-referenced transcript using the frame counts to produce the hypermedia document. The present invention produces other types of hypermedia products as well.

30 Claims, 9 Drawing Sheets

OTHER PUBLICATIONS

Joan Bachenko, Jeffrey Daugherty, and Eileen Fitzpatrick, *A Parser for Real–Time Speech Synthesis of Conversational Texts*, Proceedings of the ACL Conference on Applied Natural Language Processing, Apr. 1992.

Behzad Shahraray, *Scene Change Detection and Content-Based Sampling of Video Sequences*, Digital Video Compression: Algorithms and Technologies 1995, Proceedings of the SPIE 2419, Feb. 1995.

Patrick A. V. Hall and Geoff R. Dowling, *Approximate String Matching*, ACM Computing Survey, vol. 12, No. 4, 1980.

Daniel S. Hirschberg, *Algorithms for the longest common subsequence problem*, Journal of the ACM, 24(4):664–675, Oct. 1977.

Robert A. Wagner and Michael J. Fischer *The String-to–String Correction Problem*, Journal of the ACM, 21(1):168–173, Jan. 1974.

Artificial Intelligence Frontiers in Statistics: AI and Statistics, Chapter 21 *A Statistical Approach to Aligning Sentences in Bilingual Corpora*, (D.J. Hand ed., Chapman & Hall 1993).

B. Shahraray et al., "Automated Authoring of Hypermedia Documents of Video Program", *Proc. Third Int. Conf. on Multimedia (ACM Multimedia '95)* San Francisco, CA (11/95).

\* cited by examiner

TOM BROKAW, anchor:

Guilty verdicts in the Whitewater trial of Clinton's former business partners and the current Arkansas governor.

New film from that fateful day in Dallas when President Kennedy was killed. Haunting memories of the end of innocence.

NBC NEWS IN DEPTH tonight, the difficult issues men face with prostate cancer, beginning to confront them.

And after a long run of cutting jobs, good news tonight. Corporate giants have help wanted signs out again.

Announcer: From NBC News, this is NBC NIGHTLY NEWS with Tom Brokaw.

TOM BROKAW, anchor:

Good evening. There are two dozen guilty verdicts tonight in the Whitewater trial that featured President Clinton as a witness for the defense on videotape. This case did not involve his Whitewater investment directly, but his former business partners and his successor as Arkansas governor were on trial for their deals. Deals involving money from institutions backed by the federal government. It was a complex case, and now President Clinton has to worry about the perception problem. NBC's Brian Williams is at the White House tonight.

```
Netscape - Nightly News on Tuesday, May 28, 06:29PM EDT. Page 1 (Pictorial Transcr...    _ □ ⨯
File  Edit  View  Go  Bookmarks  Options  Directory  Window  Help
```

| NBC NIGHTLY NEWS | 🔊 | There are two dozen guilty verdicts tonight in the Whitewater trial that featured President Clinton as a witness for the defense on videotape. This case did not involve his Whitewater investment directly, but his former business partners and his successor as Arkansas governor were on trial for their deals. Deals involving money from institutions backed by the federal |

Time: 18:30:26 Length: 00:29 government. It was a complex case, and now President Clinton has to worry about the perception problem. NBC's Brian Williams is at the White House tonight.

🔊 Brian, what's the latest there?

BRIAN WILLIAMS reporting:

🖼 Well, Tom, eight minutes ago the president decided he wanted to be on the news talking about the verdicts in this case. So, eight minutes before the network evening news broadcast went on the air, the president walked up to the microphones at the White House usually reserved for people coming to see him. Here is some of what he had to say.

Time: 18:30:58 Length: 00:15

🔊 President BILL CLINTON: As I said, for me it's a more of a personal thing today. I'm very sorry for them personally.

🔊

Time: 18:31:14 Length: 00:09

Document Done

GENERATING HYPERMEDIA DOCUMENTS FROM TRANSCRIPTIONS OF TELEVISION PROGRAMS USING PARALLEL TEXT ALIGNMENT

RELATED APPLICATIONS

The present application claims priority under 35 U.S.C. 119(e) to U.S. Provisional Patent Application serial No. 60/113,951, filed Dec. 24, 1998.

FIELD OF THE INVENTION

The present invention relates generally to generating hypermedia documents, and more specifically to automatically creating hypermedia documents from conventional transcriptions of television programs.

BACKGROUND OF THE INVENTION

Today several broadcasters are publishing transcriptions of their television programs on their web sites. Some manually augment the transcripts to include still images or audio clips (e.g. www.pbs.org, www.cnn.com). However, the amount of manual labor required to generate these hypermedia documents limits the number of programs that can be converted to web content. Method useful in generating pictorial transcripts are disclosed in a patent application entitled "Method for Providing a Compressed Rendition of a Video Program in a Format Suitable for Electronic Searching and Retrieval," U.S. Pat. No. 6,098,082, filed Jul. 16, 1996, and "Method and Apparatus for Compressing a Sequence of Information-Bearing Frames Having at Least Two Media Components," U.S. Pat. No. 6,271,892,-B1the disclosures of which are incorporated herein by reference in their entirety.

A method for converting closed captioned video programs into hypermedia documents automatically within minutes after the broadcast of the program is described in Shahraray B., and Gibbon, D., "Automated Authoring of Hypermedia Documents of Video Programs", Proc. Third Int. Conf. on Multimedia (ACM Multimedia '95), November 1995. However, the resulting quality of the pictorial transcript is a function of the level of skill of the closed caption operator and there are many errors of omission, particularly during periods of rapid dialog. Further, since the caption is typically transmitted in upper case, an automatic case restoration process must be performed. This process is complex since it requires dynamically updated databases of proper nouns, as well as higher level processing to handle ambiguous cases. Conventional transcripts of television programs however, are of higher quality since the time has been taken to assure that the dialog is accurately represented, and of course, case restoration is unnecessary.

SUMMARY OF THE INVENTION

The present invention is an apparatus, method and computer program product for producing an enriched time-referenced text stream using a time-referenced text stream and an enriched text stream. The method includes the steps of receiving the time-referenced text stream and the enriched text stream; aligning the text of the enriched text stream with the text of the time-referenced text stream; and transferring time references from the time-referenced text stream to the enriched text stream based on the alignment to produce an enriched time-referenced text stream. In one embodiment, the time-referenced text stream is a closed-captioned text stream associated with a media stream the enriched text stream is a transcript associated with the media stream.

The method further includes the steps of receiving a multimedia stream; extracting the closed-captioned text stream from the multimedia stream; receiving a portion of a media stream of the multimedia stream; and linking a portion of the enriched time-referenced text stream with the portion of the media stream based on the time references to produce a hypermedia document.

In one embodiment, the method includes the steps of receiving a user request to generate a hypermedia document; and generating a hypermedia document in response to the user request using a selected template. The selected template can be specified by the user.

Further features and advantages of the present invention, as well as the structure and operation of various embodiments of the present invention are described in detail below with reference to the accompanying drawings. In the drawings, like reference numbers indicate identical or functionally similar elements. Additionally, the left-most digit(s) of a reference number identifies the drawing in which the reference number first appears.

BRIEF DESCRIPTION OF THE DRAWINGS

A pictorial transcript generated using the closed caption shown in the FIG. 1 is shown in FIG. 2.

An example computer system 800 is shown in FIG. 8.

DETAILED DESCRIPTION OF THE INVENTION

The present invention provides an automatic method for creating hypermedia documents from conventional transcriptions of television programs. Using parallel text alignment techniques, the temporal information derived from the closed caption signal is exploited to convert the transcription into a synchronized text stream. Given this text stream, the present invention creates links between the transcription and the image and audio media streams.

First, an appropriate method for aligning texts based on dynamic programming techniques is described. Then, results of text alignment on a database of 610 broadcasts (including three television news programs over a one-year period) containing caption, transcript, audio and image streams are presented. Correspondences for from 77 to 92% of the transcript sentences have been found, depending on the program set. Approximately 12% of the correspondences involve sentence splitting or merging.

Next a system is described that generates several different HTML representations of television programs given the closed captioned video and a transcription. The techniques presented here produce high quality hypermedia documents of video programs with little or no additional manual effort.

The present invention provides high quality pictorial transcripts that are automatically created by combining the best aspects of both real-time closed captioning and conventional transcription. In order to create a hypermedia document from a conventional transcript, the text is assigned time stamps to create links to other media such as still video frames or an audio stream. The required timing information is derived from the closed caption stream by modifying techniques from the field of parallel text matching to suit this particular application. By applying these results, the present invention provides a system that periodically feeds a web server with hypermedia documents of television programs. While a program is airing, or shortly afterwards, the closed caption pictorial transcript is made available on the server. As soon as the transcription is available, perhaps received via e-mail, the closed captioned text can be replaced with the text from the transcription.

Automated multimedia authoring tools are not meant to replace the human element, but rather to reduce the repetitive tedious aspects of content creation. For truly high quality web publishing applications, the automatically generated closed caption pictorial transcripts should be thought of as rough drafts. They must be edited manually in three main areas: 1) image selection, 2) closed caption text errors and 3) closed caption synchronization errors. While there have been some attempts at automating the process of selecting the best still image to represent a video shot, human judgement will never be fully supplanted in this area. However, by replacing the closed caption with a high quality transcription, the editor can be relieved of correcting the text. The synchronization errors arise from the fact that news programs are often captioned in real-time. Due to typing delay, there is a lag of anywhere from two to ten seconds from the time a word is uttered until it appears in the closed caption stream. The errors effect not only the links to continuous media streams (audio and video), but also the association of text with still images. Current automatic speech recognition (ASR) techniques can be applied in many cases to recover the synchronization. One such technique is described by Hauptmann A. and Witbrock, M. in "Informedia: News-on-Demand", Multimedia Information Acquisition and Retrieval, 1996. The performance of the ASR methods will improve with the more accurate transcription made available through the use of the present invention.

In addition to creating better pictorial transcripts, the process of aligning closed caption text with transcription text enables other applications in which the transcript is viewed as a media stream. For example, the transcript can be encoded in an ASF (advanced streaming format) file, and then replayed in a window, synchronized to streaming video playback. ASF is described in "Advanced Streaming Format (ASF) Specification", available for download from www.microsoft.com/asf. Also, when using standard text information retrieval systems to access a large multimedia database, the more accurate transcript text will offer some improvement over the closed caption text.

This document is organized as follows: first, background information on closed captioning, pictorial transcripts, and conventional transcriptions is presented. Then a corpus of multimedia information is described and the parallel text alignment algorithm is disclosed. Finally, the results of applying the algorithm to the database are presented.

Witbrock and Hauptmann have used the closed caption text to help train an automatic speech recognition system, as described in "Improving Acoustic Models by Watching Television", Personal communications, February 1997. They report a word error rate for closed captions of 16%. Using the alignment techniques presented here, the transcription could be used in place of the closed caption text, effectively reducing the word error rate and giving better training performance.

There is a large amount of work focused on the problem of aligning parallel texts from bilingual corpora. For example, see Gale, W. and Church, K., "A Program for Aligning Sentences in Bilingual Corpora", Computational Linguistics, 1993. The present invention has been used to obtain good initial results by applying techniques developed for aligning translations with character resolution to the caption/transcript alignment problem. See Church, K., "Char-align: A Program for Aligning Parallel Texts at the Character Level", Association for Computational Linguistics, pp. 9–16, 1993.

Figure 1:
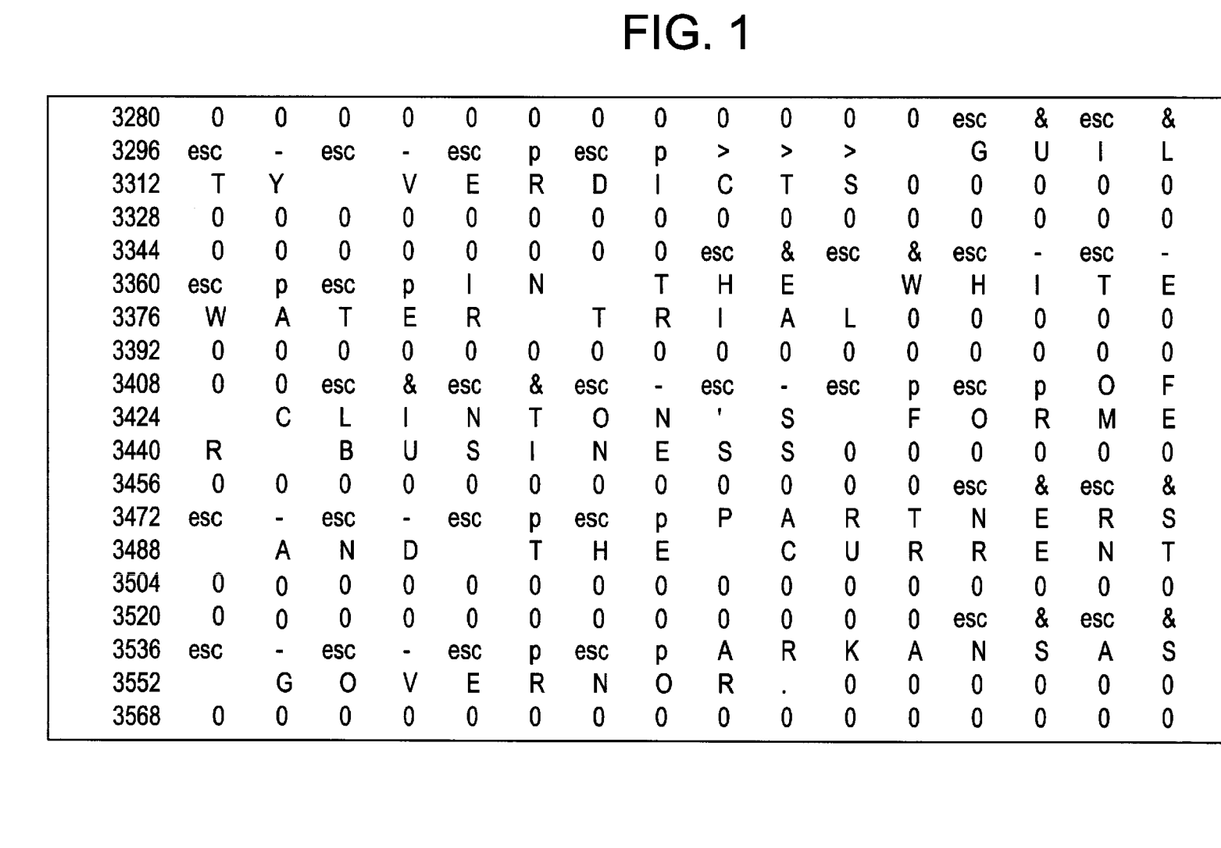
FIG. 1 shows a dump of the unprocessed caption data from the beginning of a television news program.

The closed caption is transmitted as two ASCII characters on every other video field, as described in Electronic Industries Association, EIA-608 Recommended Practice for Line 21 Data Service, Draft Proposal, Jun. 17, 1993. FIG. 1 shows a dump of the unprocessed caption data from the beginning of a television news program. The figure includes entries for each video frame; null characters indicate the absence of text for a given frame and are shown here by a "0" character. The column on the left indicates the video field for each character relative to the start of the acquisition. Caption control information (e.g. for clearing the display or for cursor positioning) is sent using repeated escape sequences. (The repetition offers some error resilience). By convention, speaker changes are often indicated by the sequence ">>", and beginnings of segments can be indicated by ">>>".

Lexical and linguistic processing are used to convert the caption to lower case, and to find the sentence boundaries. See Bachenko, J., Daugherty, J., and Fitzpatrick, E., "A Parser for Real-Time Speech Synthesis of Conversational Texts", Proceedings of the ACL Conference on Applied Natural Language Processing, April 1992 and Shahraray B., and Gibbon, D., "Automated Authoring of Hypermedia Documents of Video Programs", Proc. Third Int. Conf. on Multimedia (ACM Multimedia '95), November 1995. Table 1 shows the results of the processing. The time (shown here in units of video field number) of the first and last character of each sentence is all that is needed to render a pictorial transcript. The repeated greater-than (">") characters are removed, and their positions recorded. To support other applications, an intermediate representation of the caption data can be retained which includes all information necessary to reproduce the caption display (e.g. cursor positioning, font changes).

TABLE 1

Results of Closed Caption Processing.

| Start | End | Text |
|---|---|---|
| 3308 | 3361 | Guilty verdicts in the Whitewater trial of Clinton's former business partners and the current Arkansas governor. |
| 3638 | 3770 | New film from that fateful day in Dallas when President Kennedy was killed. |
| 3810 | 3892 | Haunting memories of the end of innocence. |
| 4030 | 4262 | NBC News "in depth," the difficult issues men are beginning to face with prostate cancer. |
| 4482 | 4712 | And after a long run of cutting jobs, good news tonight -- corporate giants have help wanted signs out again. |
| 4940 | 5322 | Good evening. |

To create a pictorial transcript, the processed caption information is combined with information derived by sampling the video stream based on visual content. See Shahraray, B., "Scene Change Detection and Content Based Sampling of Video Sequences", Digital Video Compression: Algorithms and Technologies 1995, Proceedings of the SPIEE 2419, February 1995. This analysis produces a set of image descriptors that can be used to insert still images into the closed caption text at appropriate points. To render a pictorial transcript, the anchors to the other media streams are displayed between sentences in a preferred embodiment. Therefore, the time stamps in the image descriptors are justified with time stamps from the closed caption text stream so that images are inserted only at sentence boundaries. In alternative embodiments, anchors can be placed elsewhere in the text. Further processing modifies the list to improve page layout. For example, several images can map to the same sentence, and a single frame may be chosen from the resulting set.

Figure 2:
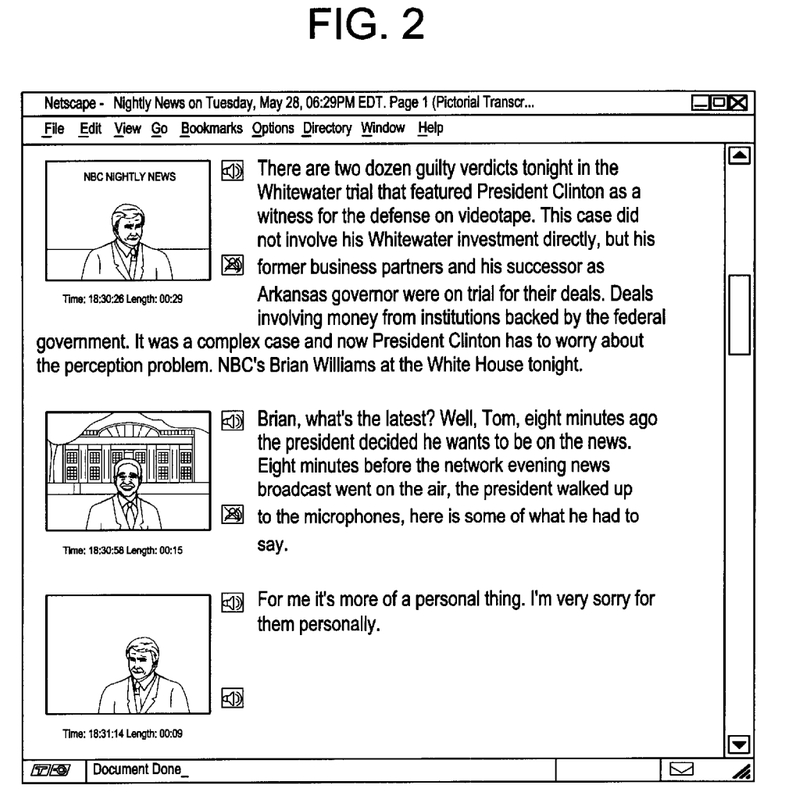

A pictorial transcript generated using the closed caption shown in the FIG. 1 is shown in FIG. 2. This news program was captioned in "real-time" (as it was being broadcast) and there is a lag of several seconds between the audio and the text. This gives rise to non-optimal image placement in some cases (e.g. the sentence "Brian, what's the latest?" should be associated with the preceding paragraph). Note that since the text matching process simply replaces the closed caption text with the transcription text, this type of synchronization error is not corrected.

Figure 3:
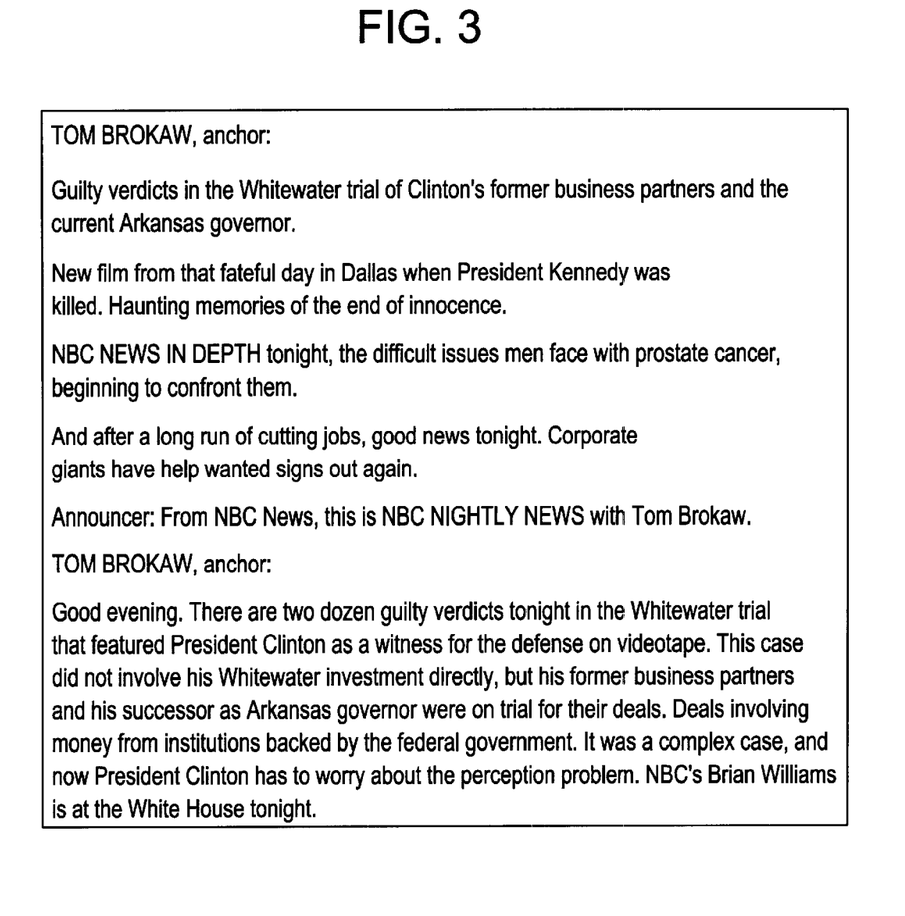
FIG. 3 shows the transcript from Burrelles for the program we have been exemplifying.

Several media monitoring organizations provide transcriptions of television news programs (e.g. Burrelle's Information Services, Livingston, N.J., www.burrelles.com and Lexis-Nexis, Dayton, Ohio, www.lexis-nexis.com). For example, Burrelle's Information Services generates transcripts as an offshoot of their main business which is electronic clipping—scanning media for clients interested in particular topics. The transcripts are typically available several hours after the program airs. FIG. 3 shows the transcript from Burrelles for the program we have been exemplifying. Comparing this with FIG. 2, we see the benefits of conventional transcription versus the closed caption (see Table 2). Also, note that the Burrelles transcript adds phrases that indicate the speaker. Speaker changes in the closed caption are often indicated by ">>", and sometimes by phrases as well. In cases in which text appears in the video image, the caption will omit the text, while the transcript will sometimes include the text. Both the caption and the transcript may include other departures from a strict transcription of the dialog such as [applause ] or [singing]. Transcripts sometimes include descriptions of the video such as "Begin video clip", or "voice over". Transcripts are also available in a format that includes tags (e.g. indicating the program title) to facilitate parsing.

TABLE 2

Comparison of Closed Caption with Transcript.

| Closed Caption | Transcript |
| --- | --- |
| NBC News "in depth," the difficult issues men are beginning to face with prostate cancer. Arkansas businesspeople jims and Susan mick dugal, it was about Jim | NBC NEWS IN DEPTH tonight, the difficult issues men face with prostate cancer, beginning to confront them. Arkansas business people, James and Susan McDougal. It was about Arkansas' governor, Jim |

The present invention has been used to generate pictorial transcripts from the several sources of test data, including Burrelle's transcriptions of NBC news programs received daily via e-mail, and transcripts of CNN programs obtained from CNN's web site (see Table 3). The closed caption is extracted from Direct Satellite System video. The caption text is filtered to remove commercials by retaining only roll-up mode captions, and discarding pop-up mode captions. The caption modes are determined by analyzing the caption control codes, as described above. This method of commercial removal works only for programs that have been real-time closed captioned, since off-line captioning typically utilizes the pop-up mode. The clocks on the acquisition systems are not accurately synchronized with the broadcasters, and the acquisition systems "pre-roll" prior to acquisition. This sometimes results in blocks of text at the beginning or end of the closed caption that are extraneous—the effects of this will be removed as described below. In Table 3, the "Date Range" indicates the date of the first and last instances and does not imply that the data set includes all programs between the given dates (although we have collected almost all of the NBC programs: Nightly News, Sunrise, and Dateline). The figures indicating number of words and sentences are the mean values over all instances in the data set and the values in parentheses are normalized to indicate words or sentences per minute.

TABLE 3

Test Data.

| Program | # of Items | Date Range | Length (Minutes) | Caption Words | Transcript Words | Caption Sents. | Transcript Sents. |
| --- | --- | --- | --- | --- | --- | --- | --- |
| Nightly News | 252 | 2/15/96 - 3/3/97 | 30 | 3271 (109) | 3655 (122) | 243 (8.10) | 246 (8.20) |
| Sunrise | 234 | 2/16/96 - 3/4/97 | 30 | 2882 (96) | 3412 (114) | 233 (7.76) | 249 (8.30) |
| Dateline | 108 | 2/16/96 - 3/2/97 | 60 | 6775 (113) | 8747 (146) | 570 (9.50) | 624 (10.4) |
| Crossfire | 2 | 5/6/97 - 5/14/97 | 30 | 3494 (116) | 4325 (144) | 229 (7.63) | 327 (10.9) |

TABLE 3-continued

Test Data.

| Program | # of Items | Date Range | Length (Minutes) | Caption Words | Transcript Words | Caption Sents. | Transcript Sents. |
|---|---|---|---|---|---|---|---|
| Money-line | 7 | 2/12/97 - 5/14/97 | 30 | 3240 (108) | 3689 (123) | 222 (7.40) | 241 (8.03) |
| Larry King Live | 5 | 11/27/96 - 5/7/97 | 60 | 7360 (123) | 7966 (133) | 491 (8.18) | 577 (9.62) |

Given the processed closed caption as shown in Table 1, a text alignment process is used to create a similar data structure in which the closed caption text is replaced by the corresponding text from the transcription. In a preferred embodiment, the text alignment process described below is used. In alternative embodiments, other well-known text alignment processes are used.

For transcript sentences for which no corresponding caption sentence is found, the time fields are undefined. The pictorial transcript rendering process handles sentences with undefined times by treating them as continuations of previous sentences. Although the required alignment resolution is at the sentence level, complications arising from many-to-one sentence mappings require a two phase approach. In the first phase, the word level alignment is generated. The second phase converts the word alignment into a sentence alignment.

There are well known techniques for determining the minimum number of character edits (insertions, deletions, and substitutions) required to convert one string into another. For example, see Dowling, G. R. and Hall, P. A. V., "Approximate String Matching", ACM Computing Survey, Vol.12, No.4, 1980 and Wagner, R. A, and Fischer, M. J., "The string-to-string correction problem", Journal of the ACM, 21(1):168–173, January 1974. These methods can also be used to determine whether two strings approximately match (specifically, a k-approximate match of a string differs by at most k edits). Although there are several methods for k-approximate string matching, in a preferred embodiment, the present invention employs the dynamic programming method of Wagner in which a multi-stage decision process is used to minimize a cost function. At each stage, the cumulative cost over the three edit cases (all with incremental cost equal to one) and the case of match (zero cost) is computed and the case with the minimum cost (or distance) is chosen. Assuming that we are editing one string to make it match another, the three edit cases are: 1) insert a character from the other string, 2) delete a character from this string, and 3) replace a character with one from the other string. The minimum edit distance $D(i,j)$ can be stated by the recursion relation:

$$D(i,j) = \min \begin{cases} D(i, j-1) + 1 \\ D(i-1, j) + 1 \\ D(i-i, j-1) + d(c_i, t_j) \end{cases}$$

with the initial condition $D(i,0)=0$, $D(0,j)=0$, where $$d(c_i, t_j) = \begin{cases} 0 \text{ if } c_i = t_j \\ 1 \text{ if } c_i \neq t_j \end{cases}$$

and $c_i$ and $t_j$ are typically the string characters, but in our case they will represent the closed caption and transcript words respectively (see below). The string alignment which produces the minimum cost is obtained by recording the decision (i.e. the chosen case) at each point. Although not relevant to the present discussion, this method also determines the longest common subsequence between the two strings. See Hirschberg, D. S., "Algorithms for the longest common subsequence problem", Journal of the ACM, 24(4):664–675, October 1977.

The complexity of computing the k-approximate match as described here is of order mn, where m and n are the string lengths. See Wagner, R. A, and Fischer, M. J., "The string-to-string correction problem", Journal of the ACM, 21(1):168–173, January 1974. (Note that typically n≈m). During the computation, two arrays are stored with dimension m by n. The first holds the cost which can be encoded as an unsigned 16-bit integer, and the second records the decision at each point. The four possible cases (character missing from string 1, character missing from string 2, characters match, and characters mismatch) can be encoded in two bits, but in practice, an 8-bit byte is used. Therefore, the total storage required S is:

S=3 mn bytes.

While it is possible to treat the closed caption and the transcript as two large strings to be matched, the number of operations and storage required would be prohibitive. For example, the transcription of a typical half-hour news program contains about 22000 characters, yielding S=1.4 GB. Therefore, in a preferred embodiment, each text is broken into words, and the words are treated as atomic units. We can then minimize the number of word edits, as opposed to character edits, required to convert one text into the other. Our typical news program contains 3600 words so S is reduced to 38 MB.

Once we define an equivalence operator for words, we can apply the above recursion relation directly. (The equivalence operator for characters is simply equality, perhaps ignoring case). Words must match exactly to be considered equivalent, excluding case differences, and excluding any prefix or suffix punctuation characters. We exclude case differences because the process of converting the closed caption from upper case to lower case is not reliable. We have also observed a number of cases of sentence splitting, in which a word followed by a comma in one text is followed by a period in the other. This indicates that punctuation should be ignored, and is further reason to ignore capitalization. While this relatively simple definition of word equivalence is efficient, it has the negative effect that words that differ by a single typing error are treated the same as words that have no characters in common. A two-stage method, in which words with one or two character errors are defined as matching, would correct this at the expense of some false positive matches.

Frequently occurring words (the, to, a, of, etc.), will generate false correspondences when long segments of text differ between the caption and the transcription. This is a direct result of our definition of the optimum alignment. To avoid these false correspondences, noise words are eliminated from the optimization. In the implementation presented here, we classified the ten most frequent words in the entire data set as noise words. The improvements gained by using the most frequent words in a given document, or by inverse frequency weighting, would not significantly affect the sentence level alignment. In order for the sentence alignment to be affected, the number of matching noise words would have to be a significant percentage of the total words in the sentence (see below).

Note that the memory requirements are large despite moving up from the character level to the word level. (For an hour program, S=150 MB). This can be compensated for by using banded matrices for the cost and decision arrays. For texts that are similar, the minimum cost path is near the diagonal of the cost matrix, and the rest of the matrix elements contain no useful information. To avoid calculating and storing these off-diagonal values, we treat the band edges as boundary values. The width of the band (W) determines the maximum allowable skew between the two texts, since the optimum path will never go outside the band. Determining the value for W involves a tradeoff between maximum skew and execution time (a function of memory and execution speed). For the experiment described here, we have chosen W=2000, which limits the maximum synchronization error between the caption and the transcription to 20 minutes, assuming an average of 100 words per minute. This reduces S to 43 MB for an hour program. S is now given by:

$$S = 3 \, W \, \max(n, m).$$

The word level alignment provides a fine degree of synchronization between the caption and the transcript that may be suitable for some applications. (Note that still finer level synchronization, down to the character level, is also possible.) However, as mentioned earlier, the pictorial transcript application requires sentence level alignment. While this seems like a simple transformation, cases of sentence split and merge add complexity.

The second phase of the alignment processing converts the word level alignment into a sentence level alignment. This involves no optimization; it is basically a process of combining the set of word alignment pointers with a second set of pointers that is obtained by identifying words which correspond to the beginning of sentences. Sets of word correspondences that span sentence boundaries indicate a split or merge of sentences. In cases where large blocks of text differ, the word alignment can include some false correspondences in spite of the noise word removal. We add a threshold to avoid false positive sentence matches in these cases. We consider two sentences to match if more than 20% of the words match. The percentage is calculated relative to the shorter (in number of words) of the two sentences. The value of the threshold was determined empirically to reject nearly all false positives while not significantly reducing the number of valid matches. The precision of the threshold is not critical; changing the threshold from 15 to 25% has little effect.

TABLE 4

Text Alignment Results.

| Program | Caption Sents. | Transcript Sents. | Adjusted Sentences | Matched Sents. | 1:2 | 1:3 | 2:1 | 3:1 |
|---|---|---|---|---|---|---|---|---|
| Nightly News | 243 | 246 | 243 | 92 | 6.6 | 0.4 | 5.3 | 0.0 |
| Sunrise | 233 | 249 | 229 | 77 | 6.1 | 0.4 | 4.4 | 0.0 |
| Dateline | 570 | 624 | 571 | 87 | 4.7 | 0.4 | 6.3 | 0.4 |
| Crossfire | 229 | 327 | 321 | 79 | 3.4 | 0.6 | 10.6 | 2.8 |
| Moneyline | 222 | 241 | 237 | 82 | 7.2 | 0.8 | 7.6 | 0.4 |
| Larry King Live | 491 | 577 | 546 | 93 | 4.6 | 0.4 | 9.5 | 2.6 |

Table 4 summarizes the results of running the text alignment process described above on the database. The "Adjusted Sentences" column is the mean of the number of transcript sentences for the program set adjusted to account for lost or extra caption text at the start or end of the acquisition due to synchronization errors. The intent is to prevent blocks of unmatched sentences at the beginning or end of the texts from effecting the reported match statistics. Specifically, the values indicate the mean number of transcript sentences between the first matching pair and the last (inclusive). This marginally inflates the percentage match scores, since legitimately unmatched sentences at the beginning or end of the transcript are not included in the statistics. Some columns from Table 3 are included for reference. "Matched Sentences" are listed as percentages of the "Adjusted Sentences" for which correspondences were found. The columns headed "1:2" and "1:3" indicate the percentage of matched transcript sentences that match two or three caption sentences respectively. Similarly, the "2:1" and "3:1" figures reflect two or three caption sentences mapping to a single transcript sentence. These statistics may be used to determine the probabilistic weights in sentence alignment algorithms such as in Gale, W. and Church, K., "A Program for Aligning Sentences in Bilingual Corpora", Computational Linguistics, 1993. Note that 11.7% of the matching sentences for the NBC programs are the result of splitting or merging. This justifies the word level approach over other approaches that align whole sentences only.

Figure 4:
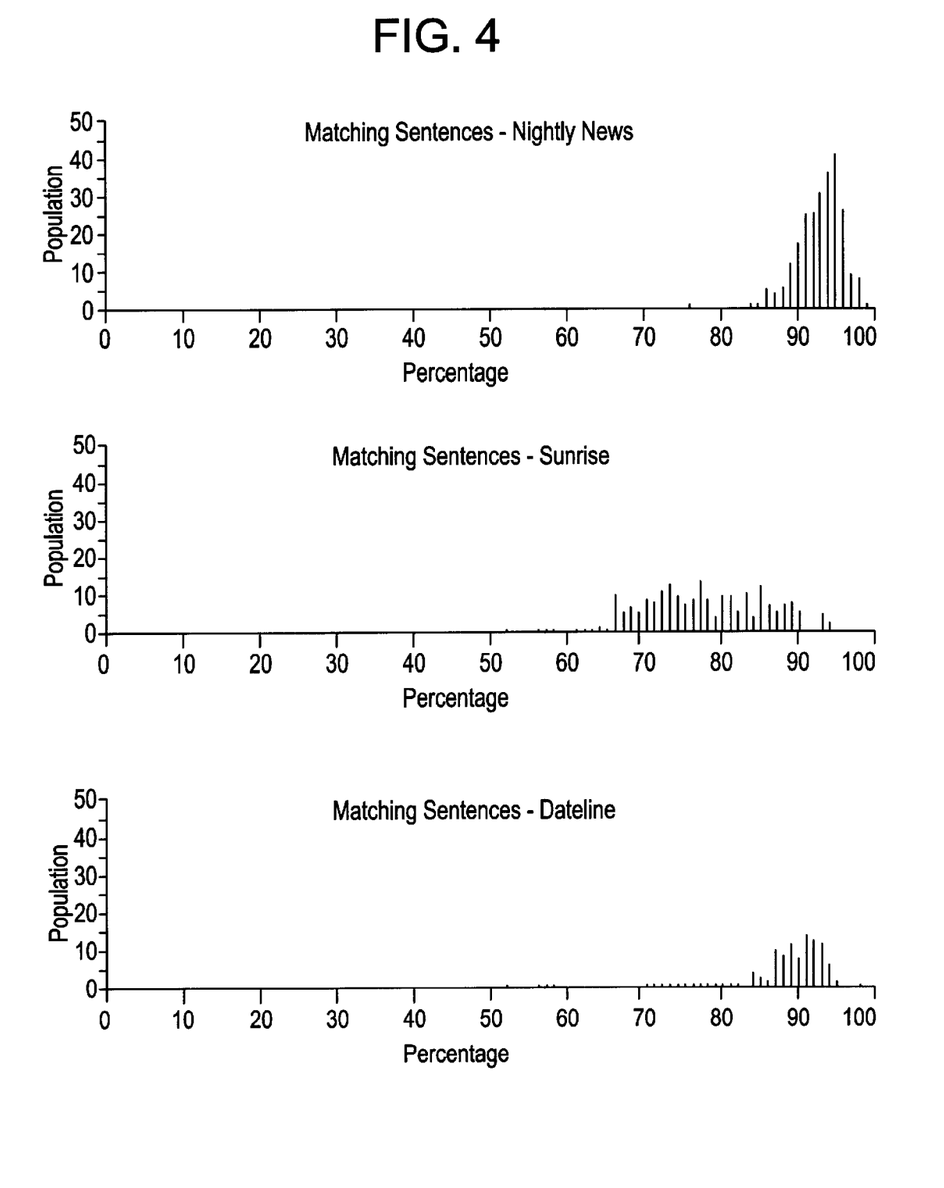
FIG. 4 shows a more detailed view of the match results for the three program sets.
Figure 5:
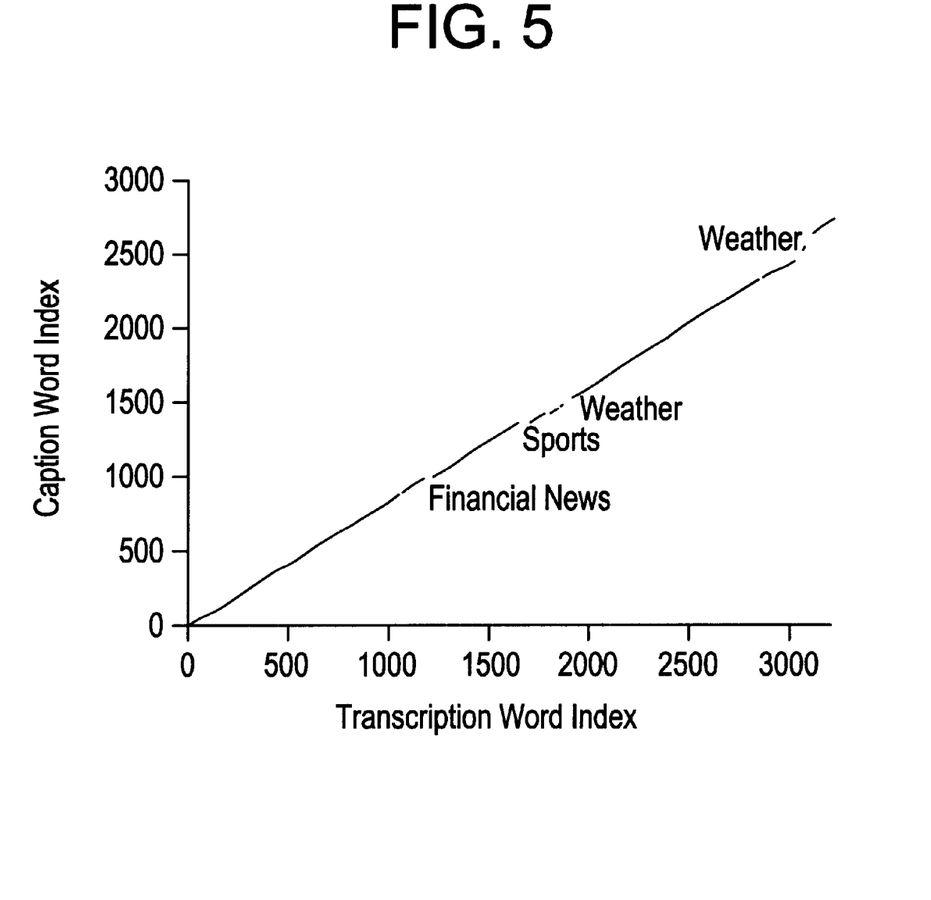
FIG. 5 presents word alignment results for a particular program.

FIG. 4 shows a more detailed view of the match results for the three NBC programs. Note that there is a significant difference in the performance depending upon the program set considered. This variation can be seen from differences in the shapes of the histograms. The few outliers in the 50% range (and even one at 40%) for Sunrise and Dateline appear to be due to problems with the corpus. It seems that the closed captions and the transcripts are referring to the similar subject matter, but there are large segments in which they differ. While the match results do have some relation to the "quality" or word error rate of the closed caption, the numbers are somewhat misleading. For example, the poor performance for the "Sunrise" program is mainly due to two program segments: sports and weather. In the sports segments, the sportscaster rapidly reads a list of game results, and it appears that the caption operator cannot keep up. A more significant effect is due to the two weather segments in the "Sunrise" program. The local weather is captioned, but entirely omitted from the transcription (replaced by the sentence: "Weather follows"). This is shown graphically in FIG. 5. Rapid dialog and general rudeness (multiple simultaneous speakers) also appear to cause problems in the "Crossfire" caption, however it should be noted that the data set is very small for the CNN programs. The mean percentage of matched sentences for the entire data set is 85. This is high enough to enable the application we have been describing, as well as other applications.

Although we believe that the data set reflects the typical level of correlation between closed captions and conventional transcriptions, there are exceptional cases. For example, the NewsHour with Jim Lehrer broadcast by PBS in time zones other than Eastern Standard Time has captions that contain very few typing errors or omissions. This is because the caption stream is edited between the live Eastern broadcast and subsequent repeat broadcasts.

Figure 6:
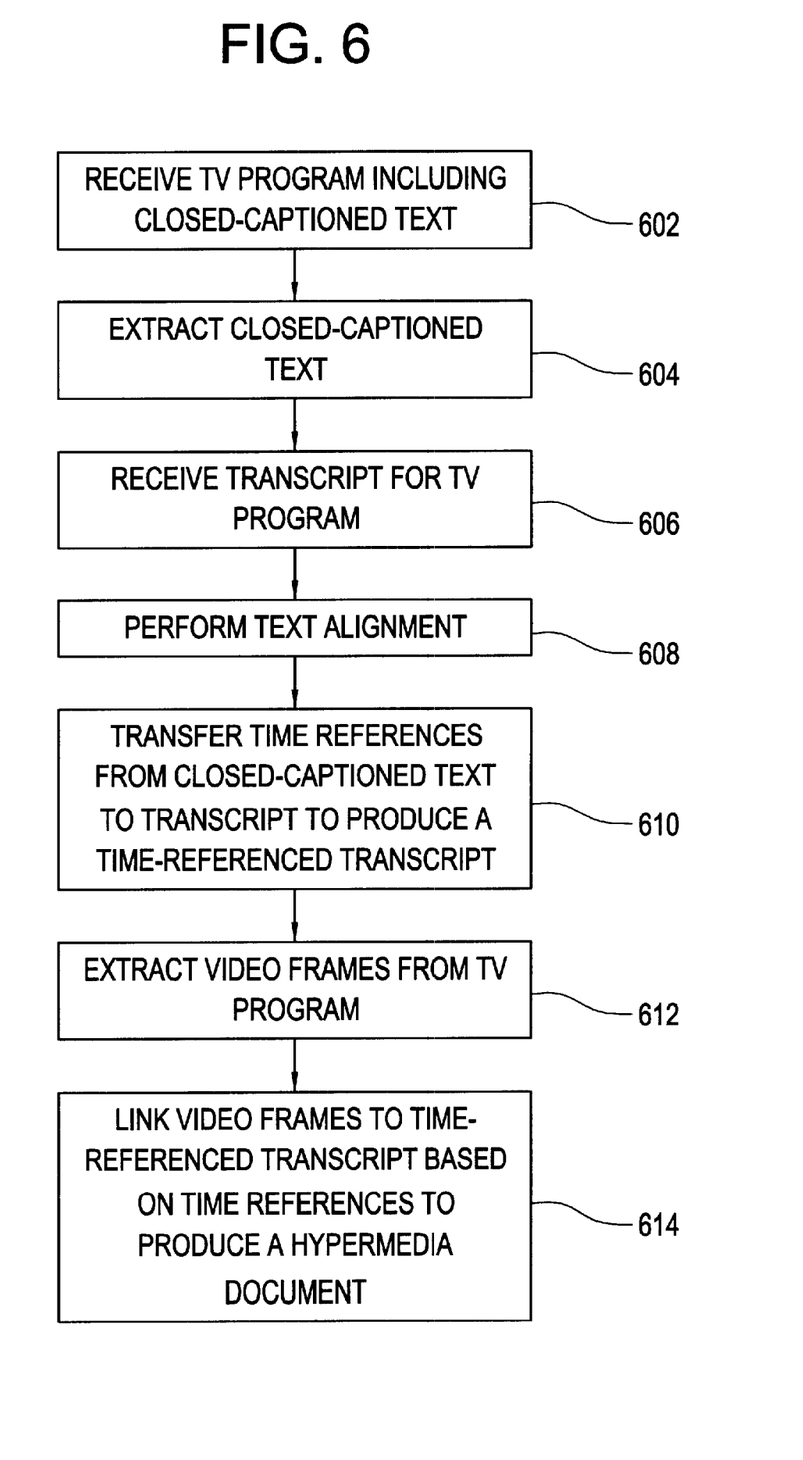
FIG. 6 is a flowchart depicting the operation of an embodiment of the present invention in generating hypermedia documents using a closed-captioned television program and a transcript associated with that program.

FIG. 6 is a flowchart depicting the operation of an embodiment of the present invention in generating hypermedia documents using a closed-captioned television program and a transcript associated with that program. In other embodiments, the present invention receives and processes other sorts of multimedia streams that include time-referenced text streams, such as an audio stream and an associated real-time transcription.

Referring to FIG. 6, the present invention receives a television (TV) program including closed-captioned text, as shown in step 602. Next, the closed-captioned text and associated frame counts are extracted from the TV program, as shown in step 604. This can be accomplished by a standard commercially-available closed-caption decoder box. In an alternative embodiment, a frame-referenced text stream is provided by an automatic speech recognizer to support programs that are not closed-captioned. Such devices are well-known in the relevant arts. In alternative embodiments, the text stream may be accompanied by other sorts of references to facilitate correspondence with its associated media streams. Therefore, in this document, the term "time references" is used to include video frame counts, time stamps, and the like. In an alternative embodiment, the present invention receives a starting frame count and generates successive frame counts based on the number of characters received and the number of characters per frame.

The present invention also receives a transcript for the TV program, as shown in step 606. The present invention in other embodiments can receive other sorts of enriched text streams. In this document, the term "enriched" is used to describe a text stream that contains information additional to that included in the time-referenced text stream. This additional information can include text corrections, more accurate text, speaker identifications, missing text, and the like.

Text alignment is then performed, as shown in step 608 and described above. This process justifies the text in the closed-captioned text and the transcript. After text alignment, the frame counts associated with the closed captioned text are transferred to the transcript to produce a frame-referenced transcript, as shown in step 610. The frame-referenced transcript can be used to generate a multitude of valuable hypermedia products; some examples are listed below. The process of FIG. 6 describes the generation of a hypermedia document using the frame-referenced transcript.

To accomplish this, individual video frames are extracted from the video portion of the television program, as shown in step 612. In a preferred embodiment, the video frames are extracted as digital images using devices such as analog-to-digital converters and the like, as would be apparent to one skilled in the relevant arts. In other embodiments, portions of other media streams within the multimedia streams can be extracted, such as portions of soundtrack of a TV program. Next, the video frames are linked to the frame-referenced transcript based on the frame counts to produce a hypermedia document, as shown in step 614.

As mentioned above, in one embodiment, the soundtrack is extracted from the television program. The frame-referenced transcript is linked to the soundtrack based on the frame counts to produce a hypermedia document such as that shown in FIG. 7. Using a hypermedia document produced according to this embodiment, a user could listen to a portion of television program's soundtrack by selecting a "speaker" icon next to the corresponding portion of the transcript.

In one embodiment, each video frame is linked to a portion of the video media stream of the television program. Using a hypermedia document produced to according to this embodiment, a user can view a portion of the video stream by selecting the corresponding video frame in the hypermedia document.

In another embodiment, each video frame in the hypermedia document is linked to both the audio and the video media streams of the television program. A user can view a portion of the television program, including the soundtrack, by selecting a video frame in a hypermedia document generated according to this embodiment.

In another embodiment, the video frames are linked to each other sequentially, and each video frame is linked to a portion of the audio stream of the television program. When a user selects a slide show icon in the hypermedia document, the user is treated to a narrated slide show comprising the video frames, displayed sequentially, accompanied by the soundtrack of the television program.

Figure 8:
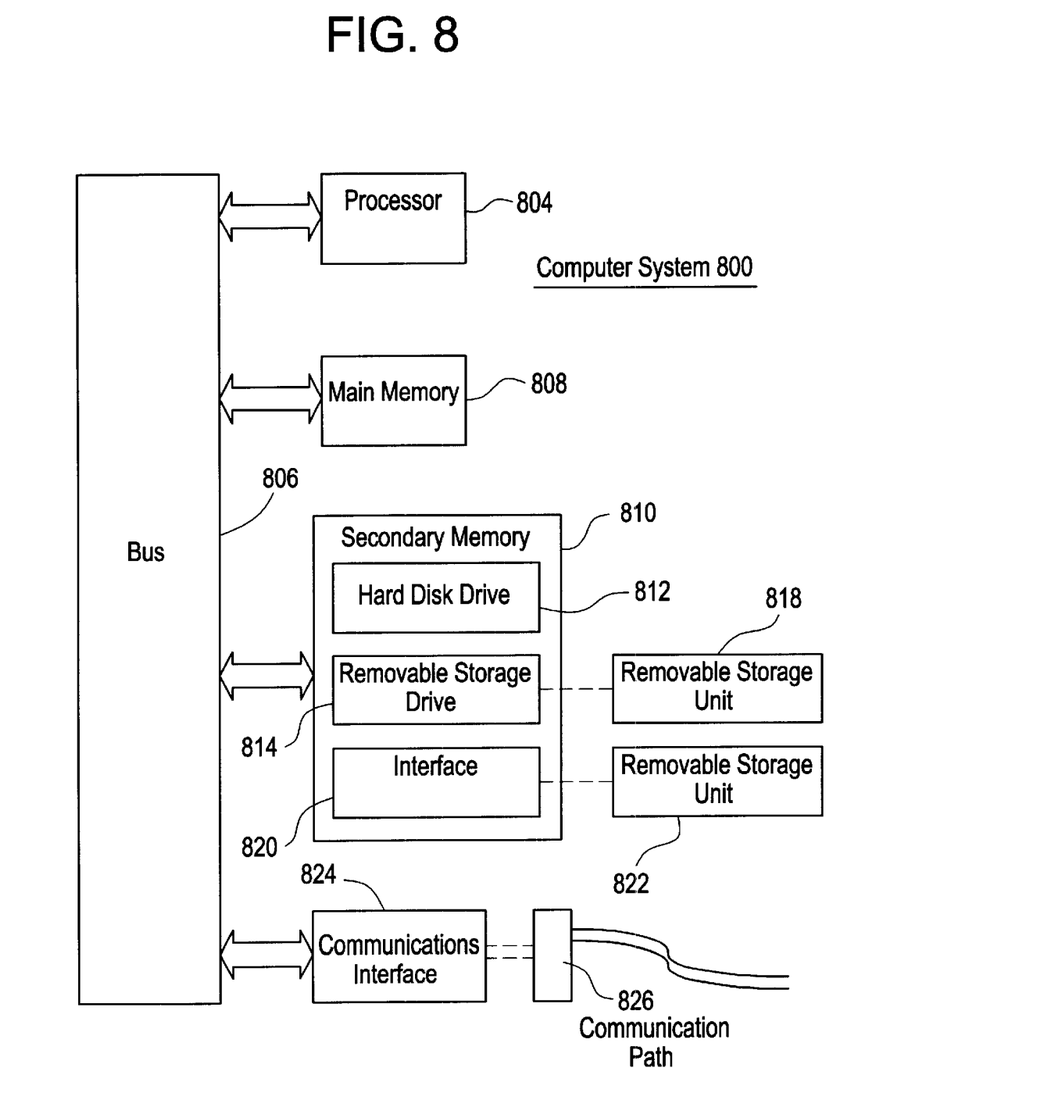

The present invention may be implemented using hardware, software or a combination thereof and may be implemented in a computer system or other processing system. In fact, in one embodiment, the invention is directed toward one or more computer systems capable of carrying out the functionality described herein. An example computer system 800 is shown in FIG. 8. The computer system 800 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples of such include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 818 to computer system 800.

Computer system 800 can also include a communications interface 824. Communications interface 824 allows software and data to be transferred between computer system 800 and external devices. Examples of communications interface 824 can include a modem, a network interface (such as an Ethereal card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface 824 via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 818, a hard disk installed in hard disk drive 812, and signals 826. These computer program products are means for providing software to computer system 800.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 9:
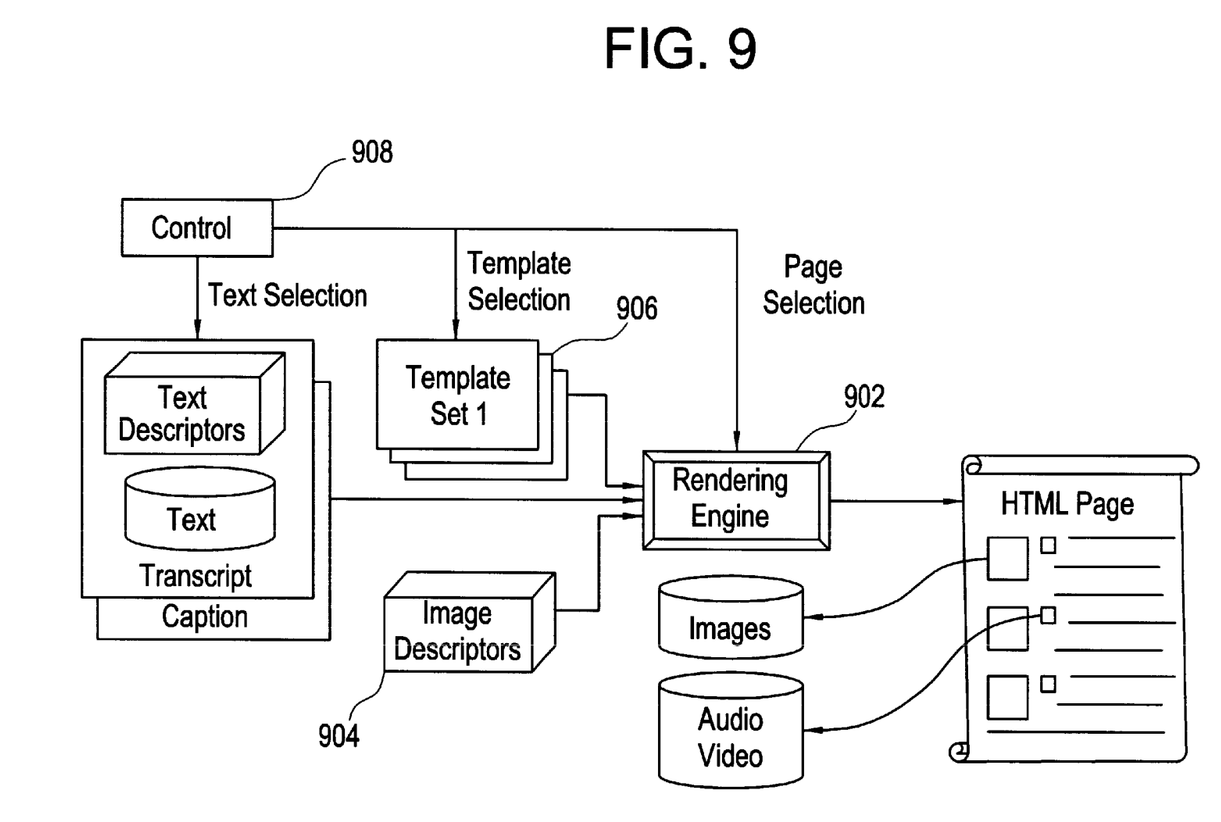
FIG. 9 depicts an embodiment of the present invention.

FIG. 9 depicts an embodiment of the present invention. Complete HTML pictorial transcripts for each program in the data can be maintained on a web server. Both the closed caption versions, as well as transcript versions, are available. Multiple views of each program are available, each generated using a selected template. Each template specifies appearance attributes of the hypermedia document to be generated. These attributes includes such parameters as font, background color, date, headers and footers, links, and the like.

FIG. 9 shows how the views are rendered. Rendering engine 902 processes the multimedia descriptors 904 and applies a template set 906 to create an HTML representation. A controlling element 908 selects the text (either closed caption or transcription), and the template set. In addition to controlling the style of the HTML pages, the template sets determine which links to other media will be included. There is no need to store multiple views as files on a web server, since the rendering engine can be run via a Common Gateway Interface (CGI) and the views can be generated as needed, or on demand in response to a user request. The user can also specify the template to be used.

Figure 7:
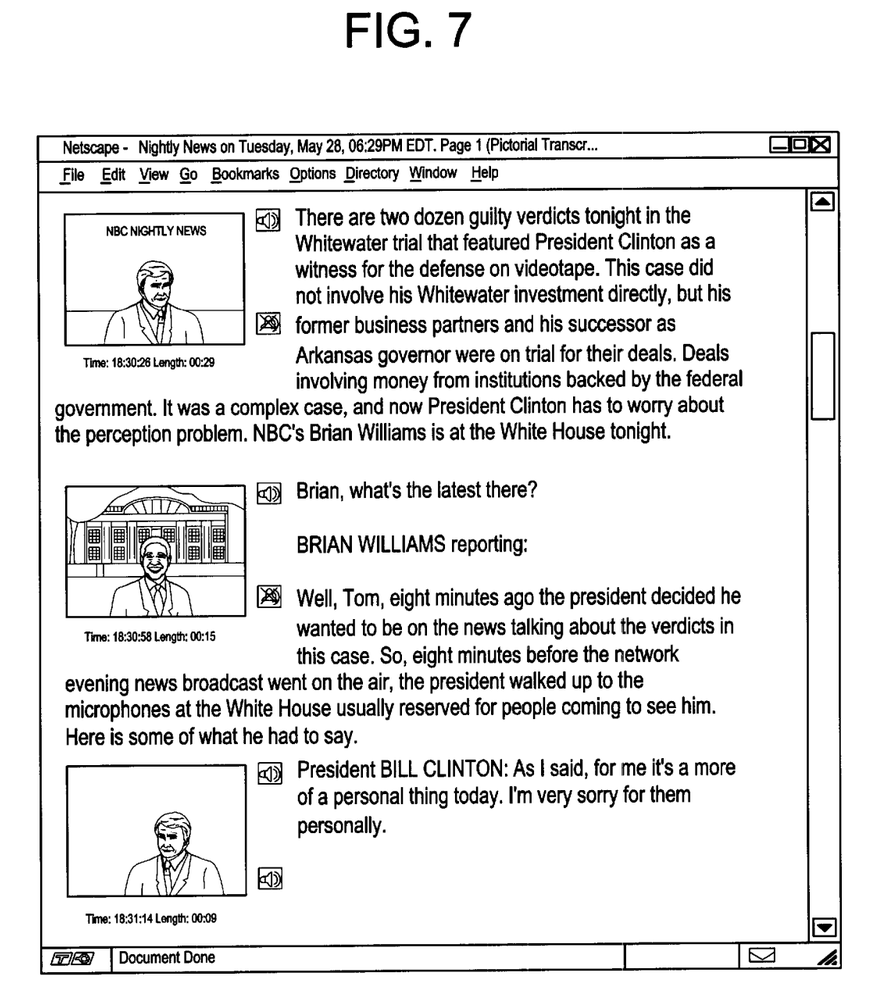
FIG. 7 depicts a hypermedia document produced according to a preferred embodiment of the present invention.

A web site designer can choose a particular control configuration, or the control can be an HTML form. Not all media types are available for every program. The present invention therefore generates control forms dynamically, after first verifying that the media types are present for a given program (e.g. the form will not allow the user to select a rendering which includes links to the video stream if the video stream is absent). One rendered view, which includes the transcription text, images, links to the audio stream, and time stamps is shown in FIG. 7. Further, a side-by-side presentation of the sentence alignment for each of the programs is available on demand using a CGI routine. Table 5 shows an excerpt of the output of the CGI routine).

TABLE 5

Sentence Alignment (rendered by a CGI program).

| Closed Caption | Transcript |
| --- | --- |
| NBC's Brian Williams at the White House tonight. | NBC's Brian Williams is at the White House tonight. |
| Brian, what's the latest? | Brian, what's the latest there? |
| Well, Tom, eight minutes ago the president decided he wants to be on the news. | BRIAN WILLIAMS reporting: Well, Tom, eight minutes ago the president decided he wanted to be on the news talking about the verdicts in this case. |
| Eight minutes before the network evening news broadcast went object the air, the president walked up to the microphones, here is some of what he had to say. | So, eight minutes before the network evening news broadcast went on the air, the president walked up to the microphones at the White House usually reserved for people coming to see him. |
| (split) | Here is some of what he had to say. |
| For me it's more of a personal thing. | President BILL CLINTON: As I said, for me it's a more of a personal thing today. |
| I'm very sorry for them personally. I did what I was asked to do, and now I've got to go back to work. | I'm very sorry for them personally. But I -- I did what I was asked to do, and now I've got to go back to work. And that's what I intend to do. Unidentified Reporter: Did the jurors not believe you? |
| Reporter: this case was about Arkansas businesspeople jims and Susan mick dugal, it was about Jim GUY Tucker and bad bank loans and fraud. | WILLIAMS: This case was about Arkansas business people, James and Susan McDougal. |
| (split) | It was about Arkansas' governor, Jim Guy Tucker. |
| (split) | And it was about bad bank loans and fraud. |
| The White House from the beginning made sure we all knew that this was not about the president. | The White House, from the beginning, made sure we all knew this was not about the president. |
| While not guilty on all counts, the jury found plenty of wrongdoing, and in the process handed a big victory to the government. | While not guilty on all counts, the jury found plenty of wrongdoing, and in the process handed a big victory to the government. |
| Well, obviously, this didn't turn out the way Sam and I wanted it to. | Mr. JAMES McDOUGAL (Former Whitewater Partner): This didn't exactly turn out the way Sam and I wanted it to, but I said from the start, what this jury and this judge did I would consider fair and I accept that. |

TABLE 5-continued

Sentence Alignment (rendered by a CGI program).

| Closed Caption | Transcript |
| --- | --- |
| This jury, this judge -- I'll accept what they say, and I assume we'll simply move on to the next stage of the fight. | And I assume we will simply take up the next stage of the fight. |

Conclusion

The present invention is a method for improving the quality of automatically generated hypermedia documents of video programs. A procedure for aligning the text from transcriptions with closed captions that is sufficient for this application was disclosed. It has been found that approximately 85% of the transcription sentences have correspondences and therefore can be assigned timestamps. The techniques presented here enable several applications, and an example of creating on-line content in the form of pictorial transcripts has been presented.

What is claimed is:

1. An apparatus for producing an enriched time-referenced text stream using a time-referenced text stream and an enriched text stream, comprising:

means for receiving the time-referenced text stream and the enriched text stream;

means for aligning the text of the enriched text stream with the text of the time-referenced text stream; and means for transferring time references from the time-referenced text stream to the enriched text stream based on the alignment to produce an enriched time-referenced text stream;

wherein the time-referenced text stream is a closed-captioned text stream associated with a media stream, and wherein the enriched text stream is a transcript associated with the media stream.

2. The apparatus of claim 1, further comprising:

means for receiving a multimedia stream; and means for extracting the closed-captioned text stream from the multimedia stream.

3. The apparatus of claim 2, further comprising:

means for receiving a portion of a media stream of the multimedia stream;

means for linking a portion of the enriched time-referenced text stream with the portion of the media stream based on the time references to produce a hypermedia document.

4. The apparatus of claim 3, further comprising:

means for receiving a user request to generate a hypermedia document; and means for generating a hypermedia document in response to the user request using a selected template.

5. The apparatus of claim 4, wherein the selected template is specified by the user.

6. The apparatus of claim 3, wherein the received portion of the media stream is a time-referenced video frame, further comprising:

means for associating a portion of the enriched time-referenced text stream with the video frame based on the time references to produce a hypermedia pictographic transcript.

7. The apparatus of claim 6, further comprising:

means for linking the pictographic transcript with at least one of an audio media stream and a video media stream of the multimedia stream to produce the hypermedia pictographic transcript.

8. The apparatus of claim 6, further comprising:

means for linking video frames in the hypermedia document to enable a slide show presentation accompanied by a portion of the audio media stream.

9. The apparatus of claim 6, further comprising:

means for extracting the video frame.

10. The apparatus of claim 1, wherein the time-referenced text stream is based on a media stream, and wherein the enriched text stream is based on the media stream.

11. A method for producing an enriched time-referenced text stream using a time-referenced text stream and an enriched text stream, comprising the steps of:

receiving the time-referenced text stream and the enriched text stream;

aligning the text of the enriched text stream with the text of the time-referenced text stream; and transferring time references from the time-referenced text stream to the enriched text stream based on the alignment to produce an enriched time-referenced text stream;

wherein the time-referenced text stream is a closed-captioned text stream associated with a media stream, and wherein the enriched text stream is a transcript associated with the media stream.

12. The method of claim 11, further comprising the steps of:

receiving a multimedia stream; and extracting the closed-captioned text stream from the multimedia stream.

13. The method of claim 12, further comprising the steps of:

receiving a portion of a media stream of the multimedia stream;

linking a portion of the enriched time-referenced text stream with the portion of the media stream based on the time references to produce a hypermedia document.

14. The method of claim 13, further comprising the steps of:

receiving a user request to generate a hypermedia document; and generating a hypermedia document in response to the user request using a selected template.

15. The method of claim 14, wherein the selected template is specified by the user.

16. The method of claim 13, wherein the received portion of the media stream is a time-referenced video frame, further comprising the step of:

associating a portion of the enriched time-referenced text stream with the video frame based on the time references to produce a hypermedia pictographic transcript.

17. The method of claim 16, further comprising the step of:

linking the pictographic transcript with at least one of an audio media stream and a video media stream of the multimedia stream to produce the hypermedia pictographic transcript.

18. The method of claim 16, further comprising the step of:

linking video frames in the hypermedia document to enable a slide show presentation accompanied by a portion of the audio media stream.

19. The method of claim 6, further comprising the step of:
extracting the video frame.

20. The method of claim 11, wherein the time-referenced text stream is based on a media stream, and wherein the enriched text stream is based on the media stream.

21. A computer program product for producing an enriched time-referenced text stream using a time-referenced text stream and an enriched text stream, said computer program product comprising a computer usable medium having computer readable program code means embodied in said medium, said computer readable program code means comprising:

computer readable program code means for causing a computer to receive the time-referenced text stream and the enriched text stream;

computer readable program code means for causing a computer to align the text of the enriched text stream with the text of the time-referenced text stream; and computer readable program code means for causing a computer to transfer time references from the time-referenced text stream to the enriched text stream based on the alignment to produce an enriched time-referenced text stream;

wherein the time-referenced text stream is a closed-captioned text stream associated with a media stream, and wherein the enriched text stream is a transcript associated with the media stream.

22. The computer program product of claim 21, further comprising:

computer readable program code means for causing a computer to receive a multimedia stream; and computer readable program code means for causing a computer to extract the closed-captioned text stream from the multimedia stream.

23. The computer program product of claim 22, further comprising:

computer readable program code means for causing a computer to receive a portion of a media stream of the multimedia stream;

computer readable program code means for causing a computer to link a portion of the enriched time-referenced text stream with the portion of the media stream based on the time references to produce a hypermedia document.

24. The computer program product of claim 23, further comprising:

computer readable program code means for causing a computer to receive a user request to generate a hypermedia document; and computer readable program code means for causing a computer to generate a hypermedia document in response to the user request using a selected template.

25. The computer program product of claim 24, wherein the selected template is specified by the user.

26. The computer program product of claim 23, wherein the received portion of the media stream is a time-referenced video frame, further comprising:

computer readable program code means for causing a computer to associate a portion of the enriched time-referenced text stream with the video frame based on the time references to produce a hypermedia pictographic transcript.

27. The computer program product of claim 26, further comprising:

computer readable program code means for causing a computer to link the pictographic transcript with at least one of an audio media stream and a video media stream of the multimedia stream to produce the hypermedia pictographic transcript.

28. The computer program product of claim 26, further comprising:

computer readable program code means for causing a computer to link video frames in the hypermedia document to enable a slide show presentation accompanied by a portion of the audio media stream.

29. The computer program product of claim 26, further comprising:

computer readable program code means for causing a computer to extract the video frame.

30. The computer program product of claim 21, wherein the time-referenced text stream is based on a media stream, and wherein the enriched text stream is based on the media stream.

* * * * *